(12) United States Patent
de Queiroz

(10) Patent No.: US 6,219,450 B1
(45) Date of Patent: Apr. 17, 2001

(54) BLOCKING SIGNATURE DETECTION FOR IDENTIFICATION JPEG IMAGES

(75) Inventor: Ricardo L. de Queiroz, Pittsford, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/191,810

(22) Filed: Nov. 13, 1998

(51) Int. Cl.[7] .................................................. G06K 9/48
(52) U.S. Cl. .......................... 382/199; 382/250; 382/286
(58) Field of Search .................................. 382/181, 183, 382/107, 193–194, 199, 201, 203, 205, 232, 235, 248, 250, 286–287, 291, 299; 328/395.1, 400.1, 403.1, 408.1, 420.1, 421.1, 699; 358/426, 432–433; 375/240, 240.18, 240.2, 240.24

(56) References Cited

U.S. PATENT DOCUMENTS

| | | | |
|---|---|---|---|
| 5,475,446 | * 12/1995 | Yamada et al. | 348/699 |
| 5,696,848 | * 12/1997 | Patti et al. | 382/299 |
| 5,768,404 | * 6/1998 | Morimura et al. | 382/107 |
| 5,946,414 | * 8/1999 | Cass et al. | 382/183 |

* cited by examiner

*Primary Examiner*—Amelia Au
*Assistant Examiner*—Timothy M. Johnson
(74) *Attorney, Agent, or Firm*—M. J. Nickerson

(57) ABSTRACT

A method detects if an image is compressed. The method determines a block grid within the image and establishes blocks from the determined grid. The method then computes differences between samples inside the established blocks and differences between samples across the established blocks. The method determines that the image is compressed based on characteristics derived from statistics of the computed differences.

2 Claims, 7 Drawing Sheets

BLOCKING SIGNATURE DETECTION FOR IDENTIFICATION JPEG IMAGES

FIELD OF THE PRESENT INVENTION

The present invention is directed to a method of detecting images compressed in accordance with the conventional JPEG image compression standard, and more particularly, a method of detection a blocking signature in an image to provide identification of a JPEG compressed image.

BACKGROUND OF THE PRESENT INVENTION

Data compression is required in data handling processes, where too much data is present for practical applications using the data. Commonly, compression is used in communication links, where the time to transmit is long, or where bandwidth is limited. Another use for compression is in data storage, where the amount of media space on which the data is stored can be substantially reduced with compression. A device showing either or both of these cases is a digital copier where an intermediate storage is used for collation, reprint or any other digital copier functions. Additionally, digital copiers often allow the printing of externally received data. Generally speaking, scanned images and print masters, i.e., electronic representations of hard copy documents, are commonly large, and thus are desirable candidates for compression.

The method disseminated by the JPEG committee for still image compression is described in detail in "JPEG: Still Image Compression Standard", by W. Pennebaker and J. Mitchell, published by Van Nostrand Reinhold in 1992. We will refer to the lossy compression modes based on the discrete cosine transform and it will be called JPEG compression in this application. JPEG compression is a lossy system that reduces data redundancies based on pixel to pixel correlations. Generally, in images, on a pixel to pixel basis, an image does not change very much. An image therefore has what is known as "natural spatial correlation". In natural scenes, correlation is generalized, but not exact. Noise makes each pixel somewhat different from its neighbors.

Generally, as shown in FIG. 1, a JPEG compression and decompression system is illustrated. A more complete discussion may be had by referencing U.S. Pat. No. 5,321,522 to Eschbach and U.S. Pat. No. 5,359,676 to Fan. The entire contents of U.S. Pat. No. 5,321,522 and U.S. Pat. No. 5,359,676 are hereby incorporated by reference.

Initially provided is tile memory 10 for storing an M×M portion of the image. From the portion of the image stored in tile memory, the discrete cosine transform (DCT), transformer 12 forms a frequency space representation of the image. Hardware implementations are available, such as the C-Cube Microsystems CL550A JPEG image compression processor, which operates in either the compression or the decompression mode according to the proposed JPEG standard. As will be described below, the implementation of the invention can be in either in software or hardware.

A divisor/quantization device 14 is used, from a set of values referred to as a Q-Table, stored in a Q table memory 16, so that a distinct Q table value is divided into the DCT value, returning the integer portion of the value as the quantized DCT value. A statistical encoder 20 often using Huffman codes is used to endcode the quantized DCT values to generate the compressed image that is output for storage, transmission, etc.

Discrete cosine transforms are well known, and hardware exists to perform the transform on image data, e.g., U.S. Pat. No. 5,049,991 to Niihara, U.S. Pat. No. 5,001,559 to Gonzales et al., and U.S. Pat. No. 4,999,705 to Puri.

To decompress the now-compressed image, and with reference to FIG. 1, a series of functions or steps are followed to reverse the process described. Huffman encoding is removed at decoder 50. The image signal now represents the quantized DCT coefficients, which are multiplied at signal multiplier 52 by the Q table values in memory 54 in a process inverse to the compression process. At inverse transformer 56, the inverse transform of the discrete cosine transform is derived, and the output image in the spatial domain is stored at image buffer 58.

In U.S. Pat. No. 5,321,522 and U.S. Pat. No. 5,379,122 to Eschbach, U.S. Pat. No. 5,359,676 to Fan, the standard process described in FIG. 1 is varied. The original image is compressed; the compressed representation is decompressed. The decompressed image is additionally filtered to improve appearance, but in doing so, it may be forced outside the range of images that are possibly derived from the original image. The DCT representation of the image is therefore altered, in order to force the image into the acceptable range of images. The processes may be used iteratively.

Some image formats that involve compression such those using JPEG inflict degradation to the image. When a system invokes to print one of these compressed images, the incoming image may receive special processing to remove those artifacts. First, however, one has to determine whether the image was compressed beforehand.

The present invention proposes a method to identify whether the image was compressed in the past. Moreover, the present invention proposes a method to identify whether the image was JPEG compressed in the past. By enabling identification of compressed images, the present invention will enable the printing system to steer a compressed image towards a cleaning image processing operation, thereby enabling the printing system to clean-up the image from any undesirable artifacts.

The method of the present invention is based on the analysis of subtle blocking discontinuities that are present and readily discernible in compressed images. For example in producing JPEG compressed images, the image is divided into blocks that are transformed, quantized, and compressed virtually independently. Thus, discontinuities across block boundaries (blocking effects) account for the most noticeable compression artifact caused by JPEG compression. The higher the compression the higher the blocking. The present invention performs an analysis of the blocking discontinuities as an indicative of compression history.

SUMMARY OF THE PRESENT INVENTION

One aspect of the present invention is a method for detecting if an image is compressed. The method computes the absolute difference between two neighbor pixels of an image, for all pixels of the image, horizontally and vertically; divides the results into first differences that correspond to crossing block boundaries (I) and second differences that correspond to not crossing block boundaries (II); computes histograms from samples in I and II; normalizes each histogram; and determines if the image is compressed based on a difference between the two normalized histograms.

A second aspect of the present invention is a method for detecting if an image is compressed. The method determines a block grid within the image; establishes blocks from the determined grid; computes differences between samples inside the established blocks; computes differences between samples across the established blocks; and determines that the image is compressed based on characteristics derived from statistics of the computed differences.

A third aspect of the present invention is a method of determining if an image is compressed. The method determines a block grid within the image; establishes blocks from the determined grid; for each block, computes a first set of differences from four adjacent pixels located within the block; for each block, computes a second set of differences from four adjacent pixels, each pixel being located in a corner of four adjacent blocks; computes histogram H(n) for the first set of differences and histogram H'(n) for the second set of differences; normalizes the histograms; and determines if the image is compressed based on a difference between the two normalized histograms.

A fourth aspect of the present invention is a method of determining if an image is compressed. The method determines a block grid within the image; establishes blocks from the determined grid; for each block, computes a first set of differences from a first set of four adjacent pixels located within the block; for each block, computes a second set of differences from a second set of four adjacent pixels located within the block; for each block, computes a third set of differences from a third set of four adjacent pixels, each pixel in the third set being located in a corner of four adjacent blocks; computes histogram $H_0(n)$ for the first set of differences, histogram, histogram $H_1(n)$ for the second set of differences, and histogram $H'(n)$ for the third set of differences; normalizes the histograms; and determines if the image is compressed based on a difference between the three normalized histograms.

A fifth aspect of the present invention is a method for determining a grid within an image. The method computes a first set of R sums of absolute values of the differences in a horizontal direction comprising only samples which are a predetermined number of pixels apart; computes a second set of R sums of absolute values of the differences in a vertical direction comprising only samples which are the predetermined number of pixels apart; and determines if the image contains a grid based on a relationship between the first and second sets of sums.

A sixth aspect of the present invention is a method for determining a grid location within an image. Let P(i,j) be the light intensity of image pixels at position (i,j) in the image. The method computes a first set of R sums $E_H$ of absolute values of the differences in a horizontal direction including only samples which are a predetermined pixels R apart wherein $D_H$ is equal to values in a range from 0 to R−1 and $$E_H = \sum_i \sum_j |P(i, Rj+D_H) - P(i, Rj+D_H - 1)|;$$

computes a second set of R sums $E_V$ of absolute values of the differences in a vertical direction including only samples which are a predetermined pixels R apart wherein $D_V$ is equal to values in a range from 0 to R−1 and $$E_V = \sum_i \sum_j |P(Ri+D_V, j) - P(Ri+D_V - 1, j)|;$$

determines if the image contains a grid based on a relationship between the first and second sums and a predetermined threshold; and locates a boundary in the R-pixel-spaced grid as a point vertically shifted by $D_v$ pixels from an origin and horizontally shifted by $D_H$ pixels from the origin, wherein $D_v$ and $D_H$ are values which maximize $E_V$ and $E_H$, respectively.

Another aspect of the present invention is a method for detecting if an image is compressed. The method computes the absolute difference between two neighbor pixels of an image, for all pixels of the image, horizontally and vertically; divides the results into first differences that correspond to crossing block boundaries (I) and second differences that correspond to not crossing block boundaries (II); and determines if the image is compressed based on a difference between statistics of the first and second difference sequences.

A further aspect of the present invention is a method to detect if an image is compressed. The method detects blocking artifacts in the image indicative of compression and provides an output indicative of compression upon detection of the blocking artifacts.

Further objects and advantages of the present invention will become apparent from the following description and the various features of the present invention.

BRIEF DESCRIPTION OF THE DRAWINGS

The following is a brief description of each drawing used to describe the present invention, and thus, are being presented for illustrative purposes only and should not be limitative of the scope of the present invention, wherein.

DETAILED DESCRIPTION OF THE DRAWINGS

Figure 1:
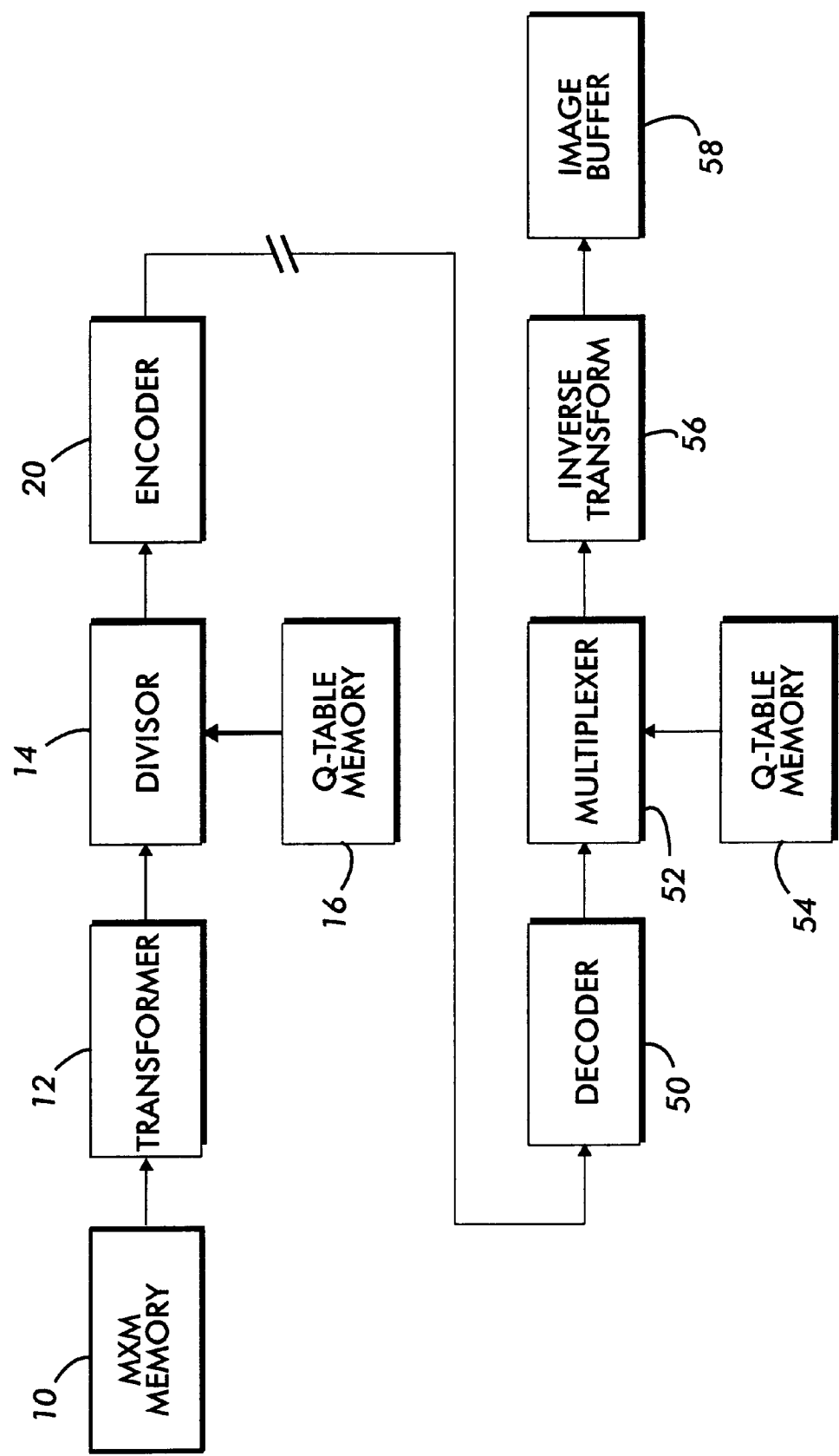
FIG. 1 shows a functional block diagram for the prior art ADCT compression/recompression process.
Figure 2:
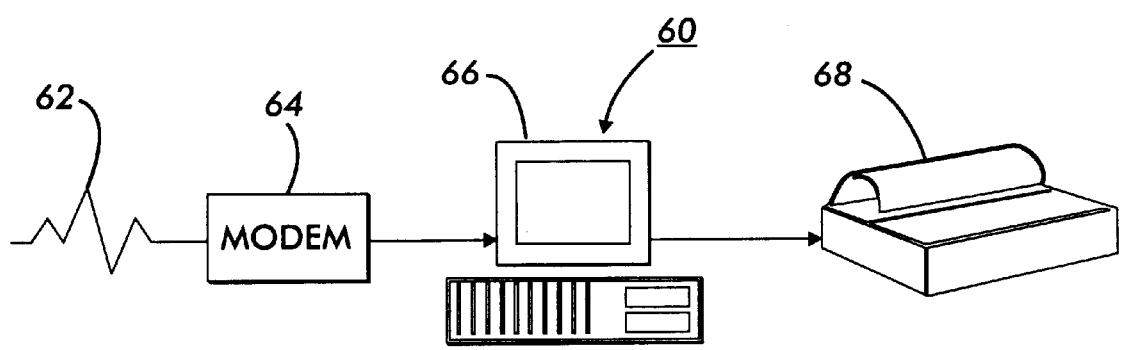
FIG. 2 shows a typical application for the proposed embodiment.

With reference initially to FIG. 2, it will be appreciated the present invention may conveniently be included in a workstation or personal computer generally indicated as 60, operating in accordance with a program implementing the method described herein. Conveniently, compressed images are received at personal computer 60 from a transmission line 62, via modem 64. Image received and decompressed may be reproduced at a display 66 associated with workstation 60; at a printer 68 with or without further processing by the workstation at memory associated with the personal computer; or for re-transmission as an uncompressed image.

As discussed above, some image formats, which involve JPEG compression, inflict degradation to the image. An example of this degradation is the formation of structure in the image that resembles an underlying grid within the image. This grid formation can be very distracting in the rendered image. Furthermore, sharp edges such as those present in images containing text and graphics may also be smoothed and distorted by JPEG compression. Thus, when printing the compressed incoming image, the image may require special processing to remove these artifacts. For example, in some printers the image may undergo sigma filtering processing to eliminate compression artifacts.

First, however, the printing system has to determine whether the incoming uncompressed image was compressed beforehand. The preferred embodiment of the present invention proposes to identify whether the image was JPEG compressed in the past based on the analysis of subtle blocking discontinuities.

In JPEG, the image is divided into blocks that are transformed, quantized, and compressed virtually independently. Thus, discontinuities across block boundaries (blocking effects) account for the most noticeable compression artifact caused by JPEG compression. The higher the compression ratio, the greater the impact of the blocking effects is on the rendered image.

As noted before, to eliminate these artifacts, the printing system needs an effective way to recognize a compressed or blocked image. The present invention performs an analysis of the blocking discontinuities as an indicative of compression history. It is noted that previously compressed images have more discontinuities across the borders of the 8×8 blocks than images that were not compressed.

Figure 3:
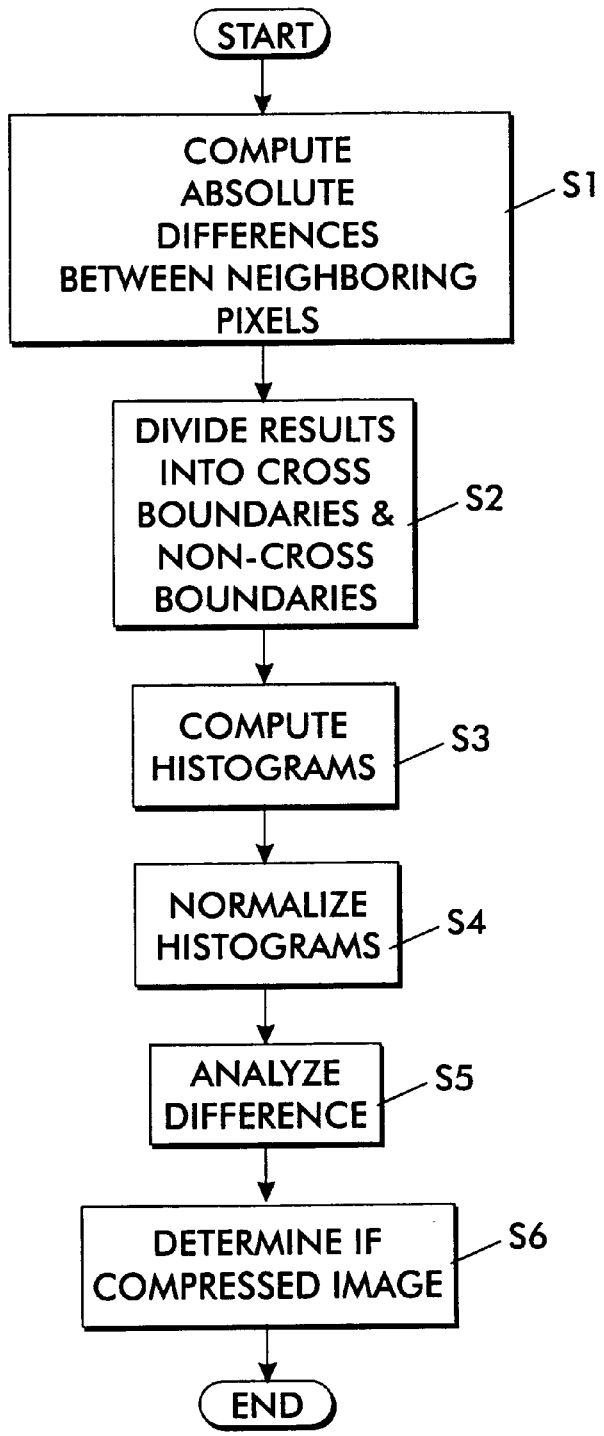
FIG. 3 is a flowchart showing one embodiment of the present invention.

Given this fact, a preferred embodiment of the present invention utilizes a method as illustrates in FIG. 3. In FIG. 3, step S1 computes the absolute difference between two neighbor pixels, for all pixels, horizontally and vertically. At step S2, the present invention divides the result into differences that cross the block boundaries (I) and those that do not cross the block boundaries (II). At Step S3, the present invention computes the histogram of samples in I and II, and then step S4 normalizes each histogram such that their sum is 1. At step S5, the present invention analyzes the difference between the two normalized histograms.

Figure 4:
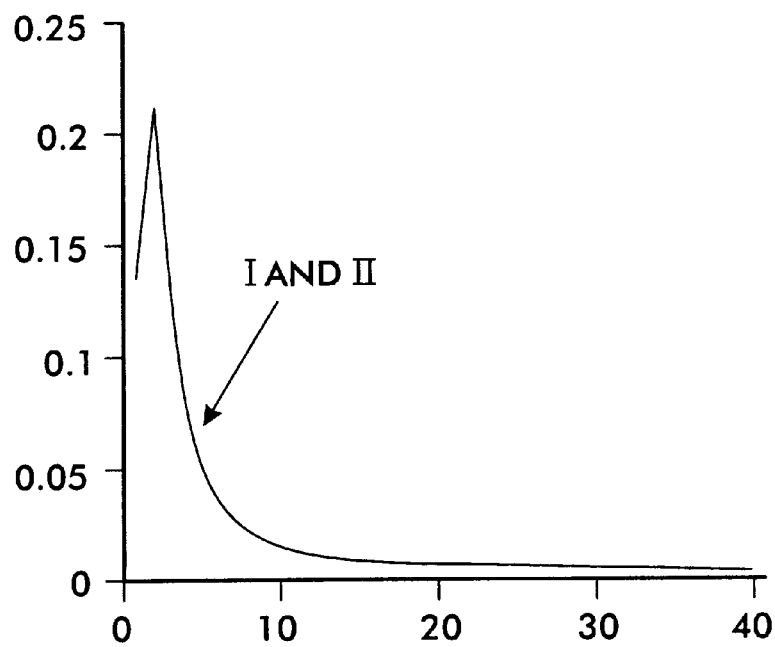
FIG. 4 illustrates normalized histograms for an uncompressed image.
Figure 5:
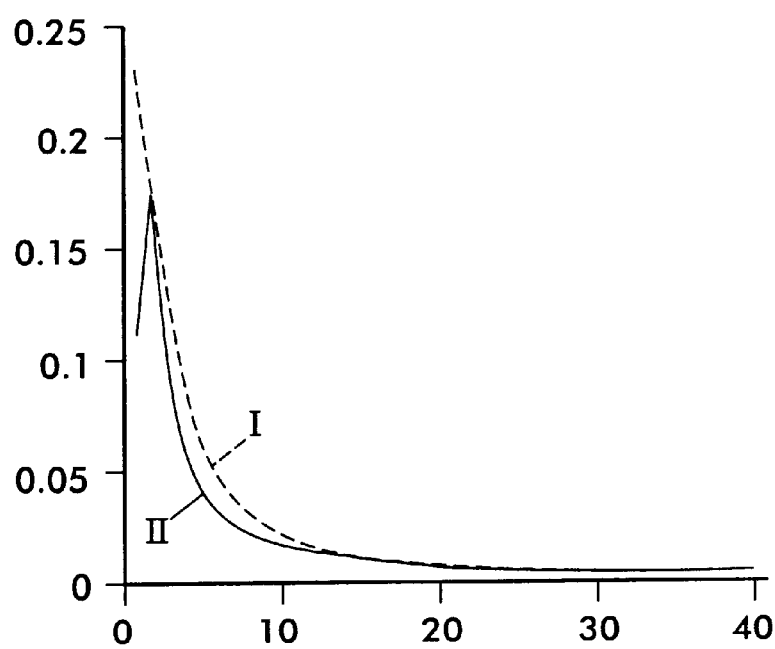
FIG. 5 illustrates normalized histograms for a compressed image.

FIG. 4 depicts a normalized histogram for an area I (across boundaries) and for an area II (internal to a block) for an uncompressed image. FIG. 5 depicts a normalized histogram for an area I (across boundaries) and for an area II (internal to a block) for the same image after compressing using quality factor 75 in standard JPEG. This quality factor maintains excellent image quality and yields only modest compression ratios, in this case 5.6-to-1.

Figure 6:
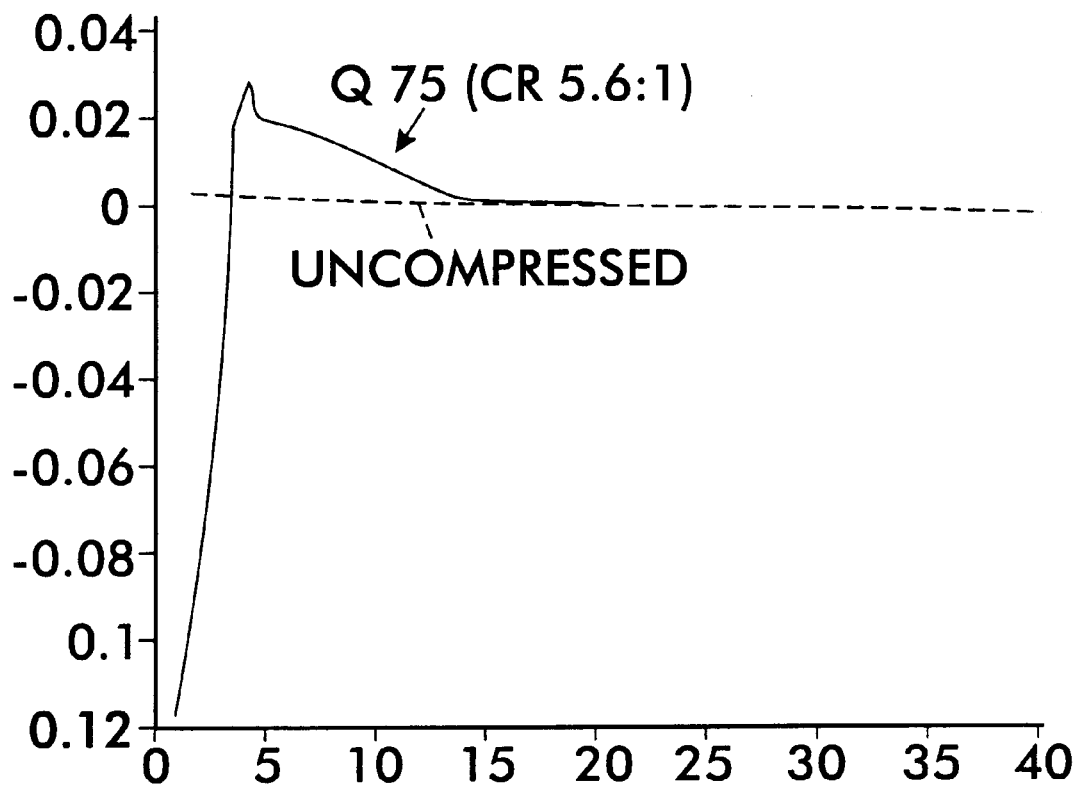
FIG. 6 illustrates the difference between FIGS. 5 and 6.

FIGS. 5 and 6 illustrate a large shift of the histograms due to the compression. First the internal differences are flattened as one can see from the fact that the number of very small differences increased. At the same time the differences across the block boundaries seemed to increase.

FIG. 6 shows the difference between the histograms in FIGS. 5 and 6 illustrating the large increase in the difference between regions I and II after the image is compressed.

One preferred embodiment of the present invention to realize the detection of the compressed image is to take the sum of the absolute differences between normalized histogram in regions I and II, i.e. K=sum(abs(norm_hist_I(0:50)-norm_hist_II(0:50))). Only the first 50 elements of the histogram are included because the neighbor-pixel differences are very unlikely to be that high even after compression and the histogram entries are virtually zero beyond this point. In other words, the remaining noisy histogram samples would not contribute to a positive identification.

The resulting number K can be compared to a predetermined threshold value for hard decision. This hard decision threshold can be established through experimentation of user choice since the threshold only effects the turning ON or OFF of the special processing operation which affects the image output, a very subjective decision based on the user's personal tastes. On the other hand, the resulting number K can be mapped to confidence numbers for a soft decision.

In one embodiment of the present invention, the method utilizes the following parameters or thresholds:

A. The image is unlikely to have been compressed if K<=0.05
B. The image is likely to have been compressed if 0.05<K<0.15
C. The image is very likely to have been compressed if K>=0.15

In order to find the correct position of the grid of 8×8 blocks (in case the image was previously cropped from another one) one must first decide where the grid lies before using the detection method described above.

The present invention finds the correct position of the grids by computing the sum of absolute values of the differences in one direction comprising only samples which are 8 pixels apart and by looking for larger appearance of blocking artifacts. Then the process is repeated for the other direction; i.e., $$E_H = \sum_i \sum_j \left| P(i, 8j + D_H) - P(i, 8j + D_H - 1) \right|$$

$$E_H = \sum_i \sum_j \left| P(8i + D_V, j) - P(8i + D_V - 1, j) \right|$$

$D_V$ and $D_H$ are selected as the values for which $E_V$ and $E_H$ were larger, respectively.

In this process, the block grid in the image is assumed to be shifted by $D_V \times D_H$ pixels from the origin. Note that the difference evaluation just needs to be done once while the results can be applied for both the energy and histogram computations.

It is evident for those skilled in the art that the present invention can be practiced to a subset of the image pixels. Said subset can correspond to a portion of the image or to a number of non adjacent pairs of pixels chosen from the image according to any reasonable criterion.

The method was tested on several images. The results are shown in Table I for 10 monochrome images, wherein QXX indicates a quality factor of XX using the example (default) JPEG quantizer tables and a scaling (quality) factor as practiced by the Independent JPEG Group's JPEG compression software. Q100 represents nearly perfect image (minimum quantization) but yielding very low compression, giving a reconstructed image that is indistinguishable from the original image since this setting achieves the best quality JPEG can provide. Q90 has invisible artifacts and its quality is excellent for all applications achieving compression ratios typically lower than 5:1. Quality factors of 50 and below are more likely scenarios where any artifact removal processing might take place.

TABLE 1

Values of K

| Image | Original | Q100 | Q90 | Q70 | Q50 | Q30 | Q10 |
|---|---|---|---|---|---|---|---|
| 1 | 0.0442 | 0.0470 | 0.0871 | 0.2437 | 0.3211 | 0.4712 | 0.6552 |
| 2 | 0.0513 | 0.0474 | 0.1141 | 0.2268 | 0.3185 | 0.4378 | 0.6047 |
| 3 | 0.0164 | 0.0173 | 0.1642 | 0.2678 | 0.3860 | 0.4045 | 0.4553 |
| 4 | 0.0393 | 0.0399 | 0.1984 | 0.3200 | 0.3984 | 0.4340 | 0.5224 |
| 5 | 0.0359 | 0.0402 | 0.1561 | 0.3098 | 0.4363 | 0.5663 | 0.7479 |
| 6 | 0.0312 | 0.0303 | 0.0508 | 0.1468 | 0.1936 | 0.2508 | 0.4039 |
| 7 | 0.0382 | 0.0387 | 0.1638 | 0.3411 | 0.4540 | 0.5767 | 0.6520 |
| 8 | 0.0415 | 0.0434 | 0.1226 | 0.1975 | 0.2795 | 0.3654 | 0.4847 |
| 9 | 0.0397 | 0.0199 | 0.3282 | 0.4155 | 0.3424 | 0.3019 | 0.3096 |
| 10 | 0.0215 | 0.0212 | 0.0529 | 0.1387 | 0.1671 | 0.2424 | 0.4656 |

Other mapping methods can be used to interpret K; e.g., mapping K ranging from 0.01 to 0.6 to a scale from 0 too 100 to indicate the likelihood that the image was compressed using JPEG.

In another embodiment of the present invention, it takes about 6 additions per block of 8×8 pixels and simple histogram manipulation to detect whether the image was previously compressed or not. The performance of this method is comparable to the one described above but has a lower implementation cost.

As noted before, the above described method (FIG. 3) analyzes the histograms of the differences between neighbor samples that cross block boundaries against differences between samples that do not cross block boundaries. In the second embodiment of the present invention, the method still performs an analysis of the blocking discontinuities as an indicative of compression history since a previously compressed image has more discontinuities across the borders of the 8×8 blocks than an image that was not compressed.

Figure 7:
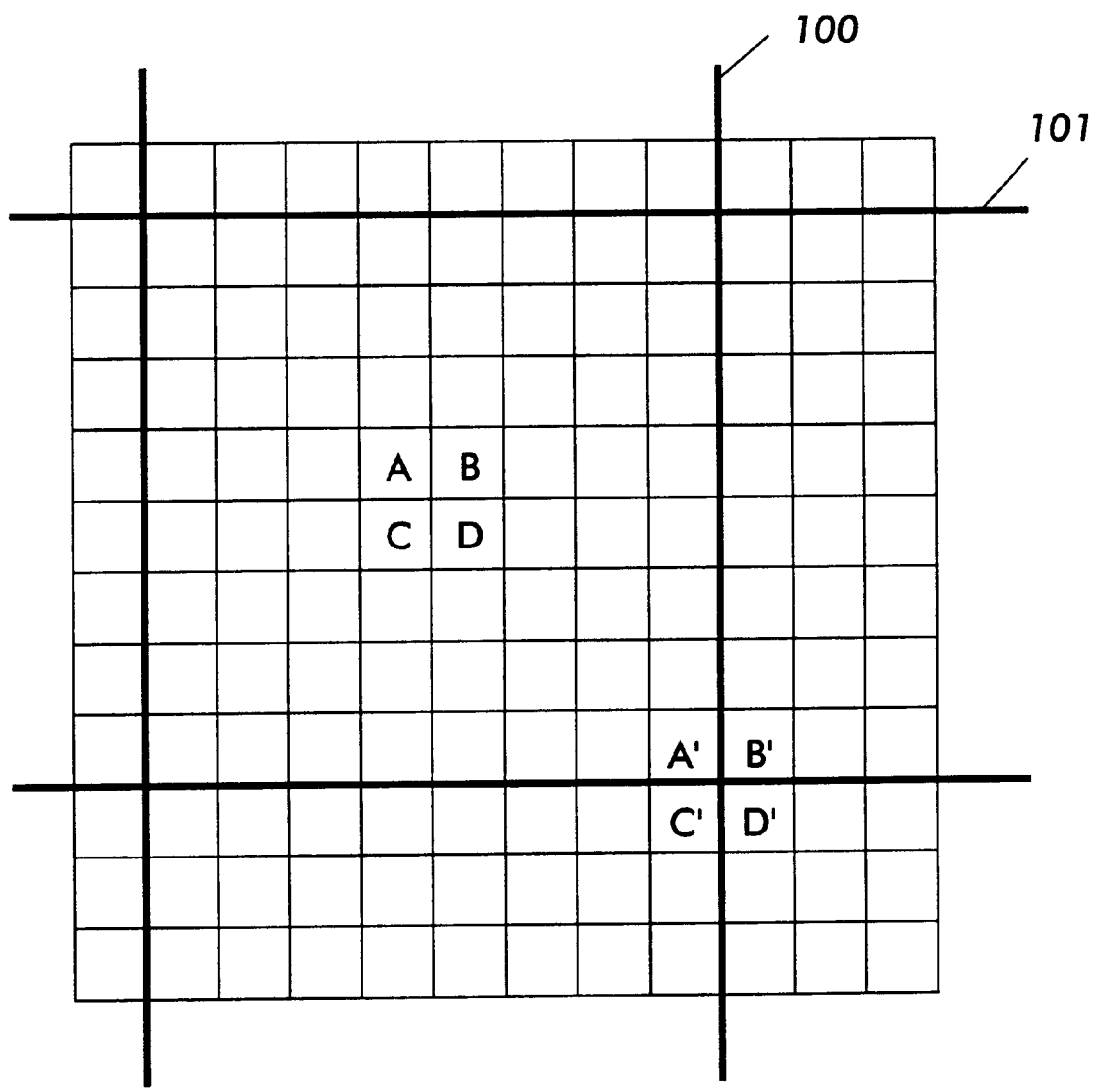
FIG. 7 illustrates pixel selection for a second embodiment of the present invention.

An example of the detection method according to the second embodiment is illustrated in FIG. 7. In FIG. 7, an 8×8 block of an image is illustrated. Referring to FIG. 7, the second embodiment utilizes 5 steps. The first step, for each block, computes Q=∥A−B−C+D∥ and Q'=∥A'−B'−C'+D'∥, actually forming a sequence of measures Q(i,j) and Q'(i,j) (one sample per block). The second step computes histograms H(n) of all Q(i,j) and H'(n) of all Q'(i,j). Next, the histograms are normalized so that the sum of entries in each one is unity. The sum of absolute value of the histogram difference is calculated as:

$$E = \sum_{n=0}^{50} |H(n) - H'(n)|$$

Lastly, the value E is mapped to a subjective or objective indication value, as discussed above.

The same images from Table 1 above were used with this second embodiment to verify how E behaves as a function of compression. The results are shown in Table 2 below.

TABLE 2

| | Values of E | | | | | | |
|---|---|---|---|---|---|---|---|
| Image | Original | Q100 | Q90 | Q70 | Q50 | Q30 | Q10 |
| 1 | 0.0779 | 0.0889 | 0.3998 | 0.7072 | 0.7982 | 0.9058 | 1.1212 |
| 2 | 0.1106 | 0.1131 | 0.4732 | 0.6795 | 0.7581 | 0.8597 | 1.1073 |
| 3 | 0.0484 | 0.0468 | 0.5243 | 0.6330 | 0.7351 | 0.7863 | 0.8758 |
| 4 | 0.2279 | 0.2258 | 0.6171 | 0.6878 | 0.8085 | 0.7555 | 0.7971 |
| 5 | 0.0266 | 0.0315 | 0.5943 | 0.9024 | 1.0789 | 1.2194 | 1.2409 |
| 6 | 0.0506 | 0.0496 | 0.1855 | 0.4167 | 0.5106 | 0.5868 | 0.8100 |
| 7 | 0.0844 | 0.0678 | 0.6359 | 0.9514 | 1.0343 | 1.1013 | 1.1232 |
| 8 | 0.0967 | 0.1071 | 0.3341 | 0.5213 | 0.7133 | 0.7921 | 0.8987 |
| 9 | 0.0355 | 0.0897 | 0.6339 | 0.6844 | 0.5876 | 0.5434 | 0.5790 |
| 10 | 0.1169 | 0.0978 | 0.1794 | 0.3527 | 0.4689 | 0.5820 | 0.8743 |

Figure 8:
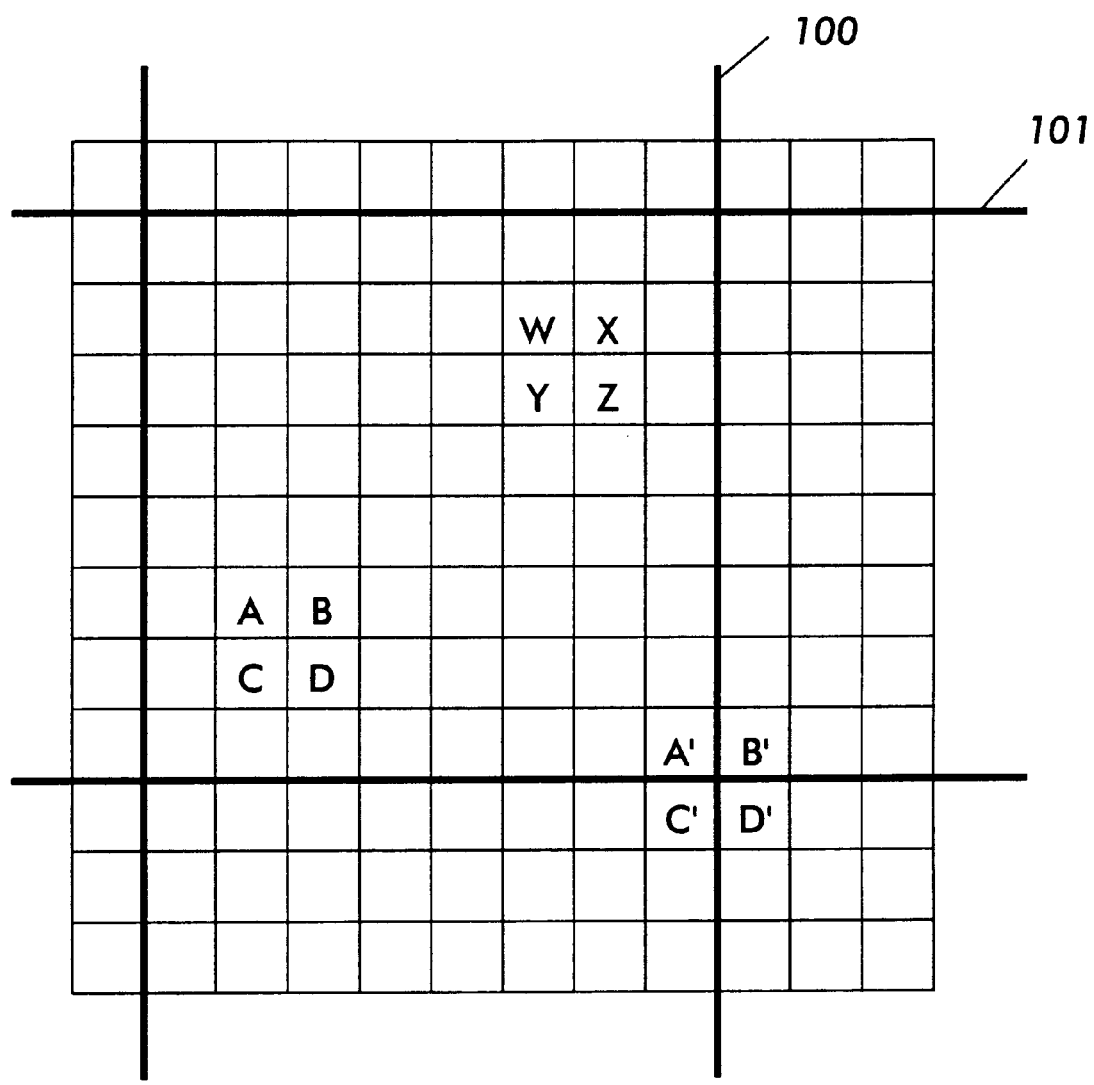
FIG. 8 illustrates pixel selection for a third embodiment of the present invention.

From this verification, the parameters for E should be as follows:
E<0.3 Not compressed at very high quality
0.3≤E ≤0.5 Likely compressed
E<0.5 Very likely compressed A third embodiment of this detection process is illustrated by FIG. 8. This embodiment uses a reference difference inside the block. With reference to FIG. 8, the method initially, for each block, computes $Q_0$=∥A−B−C+D∥, $Q_1$=∥W−X−Y+Z∥, and Q'=∥A'−B'−C'+D'∥, actually forming a sequence of measures $Q_0$ (i,j), $Q_1$ (i,j) and Q"(i,j) (one sample per block). Next, the method computes histograms $H_0$(n) of all $Q_0$(i,j), $H_1$(n) of all $Q_1$(i,j), and H'(n) of all Q'(i,j). The histograms are normalized so that the sum of entries in each one is unity, and the sum of absolute value of the histogram differences is calculated as:

$$E_0 = \sum_{n=0}^{50} |H(n) - H'(n)| \qquad E_1 = \sum_{n=0}^{50} |H_0(n) - H_1(n)|$$

Lastly, the ratio $E_0/E_1$ is mapped to a subjective or objective indication value, in the same manner as discussed above. In this embodiment, a threshold of 3 or 4 (e.g. $E_0/E_1>3$) is a reliable indicator for detecting a compressed image. This variation is more robust than the second embodiment, although requiring a little more computation. Other mapping methods can be used to interpret E; e.g., mapping E to a continuous confidence number. It is noted that E is only an indicator of blockiness in the image, therefore, one needs to be very careful to not use E to determine how much compression was applied to an image. Lastly, the position of the 8×8 block grid can be either assumed or detected.

It is evident for those skilled in the art that the present invention can be practiced to a subset of the image pixels. Said subset can correspond to a portion of the image or to a number of non adjacent pairs of pixels chosen from the image according to any reasonable criterion.

The disclosed methods may be readily implemented in software. Alternatively, the disclosed methods may be implemented partially or fully implemented in hardware using standard logic circuits or specifically on a single chip using VLSI. Whether software or hardware is used to implement the method varies depending on the speed and efficiency requirements of the system and also the particular function and the particular software or hardware systems and the particular microprocessor or microcomputer systems being utilized.

While this invention has been described in conjunction with a preferred embodiment thereof, it is evident that many alternatives, modifications, and variations will be apparent to those skilled in the art. Accordingly, it is intended to embrace all such alternatives, modifications, and variations as fall within the spirit and broad scope of the appended claims.

What is claimed is:

1. A method for determining a grid location within an image wherein P(i,j) is the light intensity of image pixels at position (i,j) in the image, comprising the steps of:

(a) computing a first set of R sums $E_H$ of absolute values of differences in a horizontal direction including only samples which are a predetermined pixels R apart wherein $D_H$ is equal to values in a range from 0 to R −1 and $$E_H = \sum_i \sum_j |P(i, Rj + D_H) - P(i, Rj + D_H - 1)|;$$

(b) computing a second set of R sums $E_V$ of absolute values of differences in a vertical direction including only samples which are a predetermined pixels R apart wherein $D_H$ is equal to values in a range from 0 to R−1 and $$E_V = \sum_i \sum_j |P(Ri+D_V, j) - P(Ri+D_V-1, j)|;$$

(c) determining if the image contains a grid based on a relationship between the first and second sums and a predetermined threshold; and (d) locating a boundary in the grid as a point vertically shifted by $D_V$ pixels from an origin and horizontally shifted by $D_H$ pixels from the origin, wherein $D_v$ and $D_H$ are values which maximize $E_V$ and $E_H$, respectively.

2. The method as claimed in claim 1, wherein R is equal to 8.

* * * * *